A. S. WHITTEMORE.

Thrashing Machine.

No. 3,403. Reissued April 27, 1869.

Witnesses.
J. M. Comb,
Fr. Ed. Hayner

A. S. Whittemore
Inventor.
per Dwight Combs & Co
Atty.

United States Patent Office.

A. S. WHITTEMORE, OF WILLIMANTIC, CONNECTICUT.

*Letters Patent No.* 74,650, *dated February* 18, 1868; *reissue No.* 3,403, *dated April* 27, 1869.

IMPROVEMENT IN THRESHING-MACHINES.

The Schedule referred to in these Letters Patent and making part of the same.

*To all whom it may concern:*

Be it known that I, A. S. WHITTEMORE, of Willimantic, in the county of Windham, and State of Connecticut, have invented a new and useful Improvement in Grain-Threshers; and I do hereby declare that the following is a full, clear, and exact description of the same, reference being had to the accompanying drawings, forming part of this specification, in which—

Similar letters of reference indicate corresponding parts in both figures.

This invention relates to grain-threshers in which rotary flails are used, and its object is to effect the threshing-operation more rapidly and effectually, and with less injury to the straw and with a less expenditure of power.

The principal feature of the invention consists in providing for the support of the grain being threshed a bearing, just out of reach of the flails, that the latter may operate upon the heads of the grain while presented over and beyond the said bearing, and while receiving no support directly below the point of operation of the flails.

The invention further consists in a novel arrangement of the flails and other working parts of the machine in relation with said fixed bearing, whereby an efficient machine is obtained.

To enable others skilled in the art to make and use my invention, I will proceed to describe it, with reference to the drawings.

A is the frame of the machine, of box-like construction, having provided upon its upper part journal-boxes *b*, for the reception of the rotary flail-shaft B, which is arranged crosswise of the frame.

Upon this shaft are firmly secured, at short and equal distances apart, rigid arms *e e*, to the ends of which are pivoted the flails *e′ e′*, of which, and the arms *e e*, there may be any suitable number.

Figure 1:
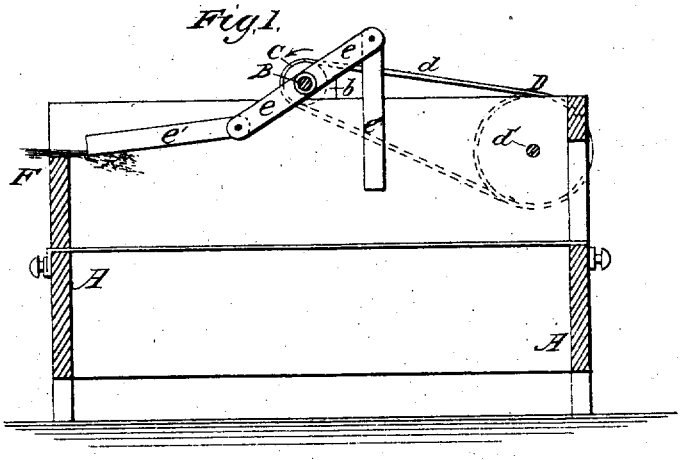
Figure 1 is a central vertical section of a grain-thresher, constructed according to my invention.
Figure 2:
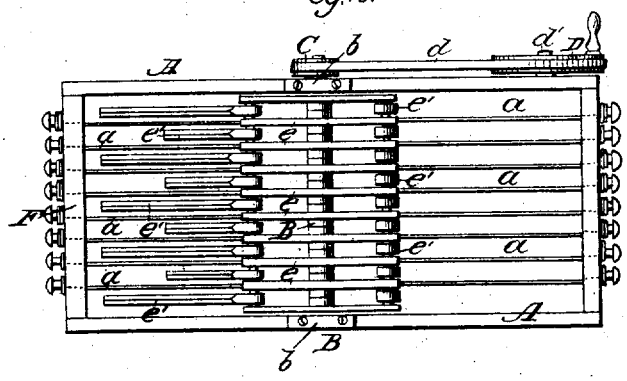
Figure 2 is a plan of the same.

D is a driving-pulley, fitted to rotate upon a fixed stud, *d′*, and serving to drive the flail-shaft B in the direction of the arrow shown in fig. 1, by means of a belt, *d*, running around it, and around a pulley, C, on the flail-shaft.

F is the fixed bearing, upon which the grain is supported during the threshing out of the kernels, the said bearing being represented as formed by the upper edge of that end of the frame toward which the flails fall during their rotary motion, produced by the rotation of the shaft B, and which is the end of the machine at which the grain is fed in.

The said bearing may, however, be constructed or formed in any other way, in such position as represented, that the flails, though approaching near to, cannot strike the said bearing, the level of which I prefer to be a little lower than that of the flail-shaft.

At some distance below the bearing F, and extending horizontally and longitudinally the whole length of the frame A, there is represented in the drawings a series of wires *a a*, serving as a screen-like platform, for the reception of the straw and grain after they have passed over the bearing F, and been subjected to the threshing-operation while supported thereon.

The operation of threshing in this machine is conducted in the following manner:

Rotary motion being imparted to the flail-shaft and flails, in the direction of the arrow shown in fig. 1, either by means of hand-power applied to the pulley D or by other means, the grain to be threshed is fed into the machine over the bearing F, either loose or in bundles, with the straw parallel with the planes of rotation of the flails, the heads of the grain being allowed to project over the said bearing toward the flails, and to remain so projecting while the flails beat out the kernels from them, after which the straw is pushed forward, and allowed to fall over the said bearing, to make room for a fresh supply of grain, to be fed in in the same manner.

The kernels of the grain fall through the wire screen *a a*, while the straw is carried forward thereon by the action of the flails, any accumulation thereon being removed by hand, by drawing it out at the end of the machine opposite to that at which the bearing F is situated.

Having thus described my invention, I will proceed to state what I claim, and desire to secure by Letters Patent.

1. In combination with the rotary flails, the bearing F, for the support of the grain being threshed at a point beyond the reach of the flails, substantially as and for the purpose herein specified.

2. I claim the threshing-machine, constructed as described, of a frame A, having a bearing F, shaft B, arms *e e*, and flails *e′ e′*, substantially as herein described.

A. S. WHITTEMORE.

Witnesses:
J. R. ARNOLD,
B. C. GRANT.